(12) United States Patent
Popoviciu et al.

(10) Patent No.: US 7,710,967 B2
(45) Date of Patent: May 4, 2010

(54) CONTROLLING ADVERTISEMENT OF MANAGEMENT PREFIXES

(75) Inventors: Ciprian P. Popoviciu, Raleigh, NC (US); Adeel Ahmed, Richardson, TX (US); Ralph E. Droms, Westford, MA (US); Salman Asadullah, Richardson, TX (US); Madhu Sudan, San Jose, CA (US); Anthony L. Hain, Woodinville, WA (US)

(73) Assignee: Cisco Technology, Inc., San Jose, CA (US)

( * ) Notice: Subject to any disclaimer, the term of this patent is extended or adjusted under 35 U.S.C. 154(b) by 1084 days.

(21) Appl. No.: 11/346,148

(22) Filed: Feb. 1, 2006

(65) Prior Publication Data

US 2007/0180483 A1 Aug. 2, 2007

(51) Int. Cl.
*H04L 12/56* (2006.01)
(52) U.S. Cl. ............ 370/392; 370/395.21; 370/395.31; 370/395.52; 370/432
(58) Field of Classification Search .......... 370/252, 370/312, 349, 352, 359, 392, 395.21, 395.3, 370/395.31, 395.52, 432, 439, 471, 475; 709/223–228
See application file for complete search history.

(56) References Cited

U.S. PATENT DOCUMENTS

| | | | | |
|---|---|---|---|---|
| 6,070,246 A * | 5/2000 | Beser | | 726/2 |
| 6,178,455 B1 * | 1/2001 | Schutte et al. | | 709/228 |
| 6,516,345 B1 * | 2/2003 | Kracht | | 709/220 |
| 6,751,230 B1 * | 6/2004 | Vogel et al. | | 370/432 |
| 7,099,326 B2 * | 8/2006 | Flinck et al. | | 370/392 |
| 7,116,643 B2 * | 10/2006 | Huang et al. | | 370/255 |
| 7,272,846 B2 * | 9/2007 | Williams et al. | | 725/111 |
| 7,290,046 B1 * | 10/2007 | Kumar | | 709/223 |
| 7,308,495 B2 * | 12/2007 | Ishiyama et al. | | 709/223 |
| 7,328,014 B2 * | 2/2008 | Takeda et al. | | 455/435.1 |
| 7,372,809 B2 * | 5/2008 | Chen et al. | | 370/229 |
| 2002/0078188 A1 | 6/2002 | Anand et al. | | |
| 2003/0106067 A1 * | 6/2003 | Hoskins et al. | | 725/119 |
| 2004/0123329 A1 * | 6/2004 | Williams et al. | | 725/111 |
| 2005/0018677 A1 * | 1/2005 | Lee et al. | | 370/389 |
| 2005/0114880 A1 * | 5/2005 | Gould | | 725/25 |
| 2005/0210290 A1 * | 9/2005 | Ono et al. | | 713/201 |
| 2005/0259645 A1 * | 11/2005 | Chen et al. | | 370/389 |
| 2005/0265261 A1 * | 12/2005 | Droms et al. | | 370/255 |
| 2006/0013150 A1 * | 1/2006 | Park et al. | | 370/254 |
| 2006/0045084 A1 * | 3/2006 | Matsuda et al. | | 370/389 |
| 2006/0159100 A1 * | 7/2006 | Droms et al. | | 370/395.2 |
| 2007/0180483 A1 * | 8/2007 | Popoviciu et al. | | 725/111 |

OTHER PUBLICATIONS

Thomson, et al., *IPv6 Stateless Address Autoconfiguration*, Dec. 1998, pp. 1-25.

Rekhter, et al., *Address Allocation For Private Internets*, Feb. 1996, pp. 1-9.

(Continued)

*Primary Examiner*—Steven H Nguyen
*Assistant Examiner*—Benjamin Elliot
(74) *Attorney, Agent, or Firm*—Stolowitz Ford Cowger LLP

(57) ABSTRACT

A management scheme compares a source address included in a received solicitation with an address for a registered endpoint. A communication including a management prefix is communicated to the endpoint when the source address matches the registered address.

15 Claims, 9 Drawing Sheets

OTHER PUBLICATIONS

Narten, et al., *Neighbor Discovery For IP Version 6 (IPv6)*, Dec. 1998, pp. 1-93.
Droms, et al., *Dynamic Host Configuration Protocol For IPv6 (DHCPv6)*, Jul. 2003, pp. 1-101.
Cable Television Laboratories, Inc., *Data-Over-Cable Service Interface Specification, DOCSIS 2.0*, Copyright 1999-2005, pp. 1-510.
Stolowitz Ford Cowger LLP, Listing of Related Cases, Nov. 19, 2009.

* cited by examiner

US 7,710,967 B2

CONTROLLING ADVERTISEMENT OF MANAGEMENT PREFIXES

BACKGROUND

The Internet has changed society and is as much a part of modern culture as television and telephones. People are becoming increasingly connected to share and access information. This interconnectivity promotes improvements in the computing and communication infrastructure.

Much of this infrastructure was designed for entertainment or communication, but is being adapted to deliver general data. The addition of general information and data transmission over the legacy infrastructure has necessarily been somewhat restrained by the need for the infrastructure to continue its initial functions. Furthermore, legacy technical characteristics of this infrastructure influence the various solutions to include information storage and transmission. Most major entertainment and communication channels now include computer networking capabilities.

Many people get their television service through cable television (CATV). CATV was initially developed to deliver television signals to areas where antennas had difficulty picking up television broadcasts. Coaxial cabling is the primary type of cabling used by the cable television industry because it is much less susceptible to interference and can carry large amounts of data.

An example use of data over a cable television network was approved by the International Telecommunications Union (ITU) which includes interface requirements for high speed data communication, and is called the data over cable service interface specification (DOCSIS).

According to DOCSIS, placing upstream and downstream data onto the cable television network requires special equipment. On the customer end, a cable modulator/demodulator (Cable Modem, or CM) transmits and receives data over the cable television infrastructure and on the cable provider end a Cable Modem Termination System (CMTS) is used to place and retrieve data from the cable television network. The CM then provides cable network access to a multitude of Customer Premise Equipment (CPE) devices.

Historically, the CPE devices sent data according to Internet Protocol version 4 (IPv4) through a CM and a CMTS to communicate with the Internet. Recently Internet Protocol version 6 (IPv6) became available and offers several advantages over IPv4. One advantage is the increased address space offered by IPv6, which is necessary for the deployment of large cable networks. Another advantage is the ability for a device to determine its own IPv6 address through StateLess Address AutoConfiguration (SLAAC). Accordingly, for this and other reasons, there is a need to adapt cable networks to use IPv6 communications.

Regardless of whether IPv4 or IPv6 is used, the CMTS needs to configure associated CMs and CPE devices. IPv4 provides stateful provisioning methods to configure CMs and CPE devices. Under stateful provisioning, the CMTS assigns addresses based on stored and predefined profiles for the CM and CPE devices.

In contrast, IPv6 provides the option to use both stateful provisioning and SLAAC. SLAAC generally requires less management by the CMTS. For example, the aforementioned profile for each CM and CPE device is not used by a CMTS under SLAAC. SLAAC also does not require the CMTS to maintain state for the provisioned devices. Accordingly, SLAAC generally scales better when a CMTS has to configure a large number of CM and CPE devices. SLAAC is therefore preferred.

Under SLAAC, instead of assigning the full address to the CM and CPE device based on individual stored profiles, a CMTS provides only the IPv6 prefix being utilized on the link. The devices then prepend the IPv6 prefix to their own unique identifiers to configure the full IPv6 address.

The lack of the profile in the CMTS makes it difficult to determine whether a particular address belongs to a CM or CPE device. This can be problematic for Multiple-System Operators (MSOs) because, for management and security reasons, they need an easy way to determine whether an address belongs to CM devices they manage or to CPE devices they do not manage.

Because of the forgoing limitations SLAAC of CMs and CPE can be impractical despite its benefits. The disclosure that follows solves this and other problems.

SUMMARY

A management scheme compares a source address included in a received solicitation with an address for a registered endpoint. A communication including a management prefix is communicated to the endpoint when the source address matches the registered address.

In one embodiment, a Cable Modem Termination System (CMTS) compares a source Media Access Control (MAC) address included in a router solicitation message with the MAC addresses of registered cable modems. The CMTS sends back a communication including a management IPv6 prefix when the source MAC address matches a registered cable modem MAC address.

The foregoing and other objects, features and advantages of the invention will become more readily apparent from the following detailed description of a preferred example of the invention which proceeds with reference to the accompanying drawings.

DETAILED DESCRIPTION

Figure 1:
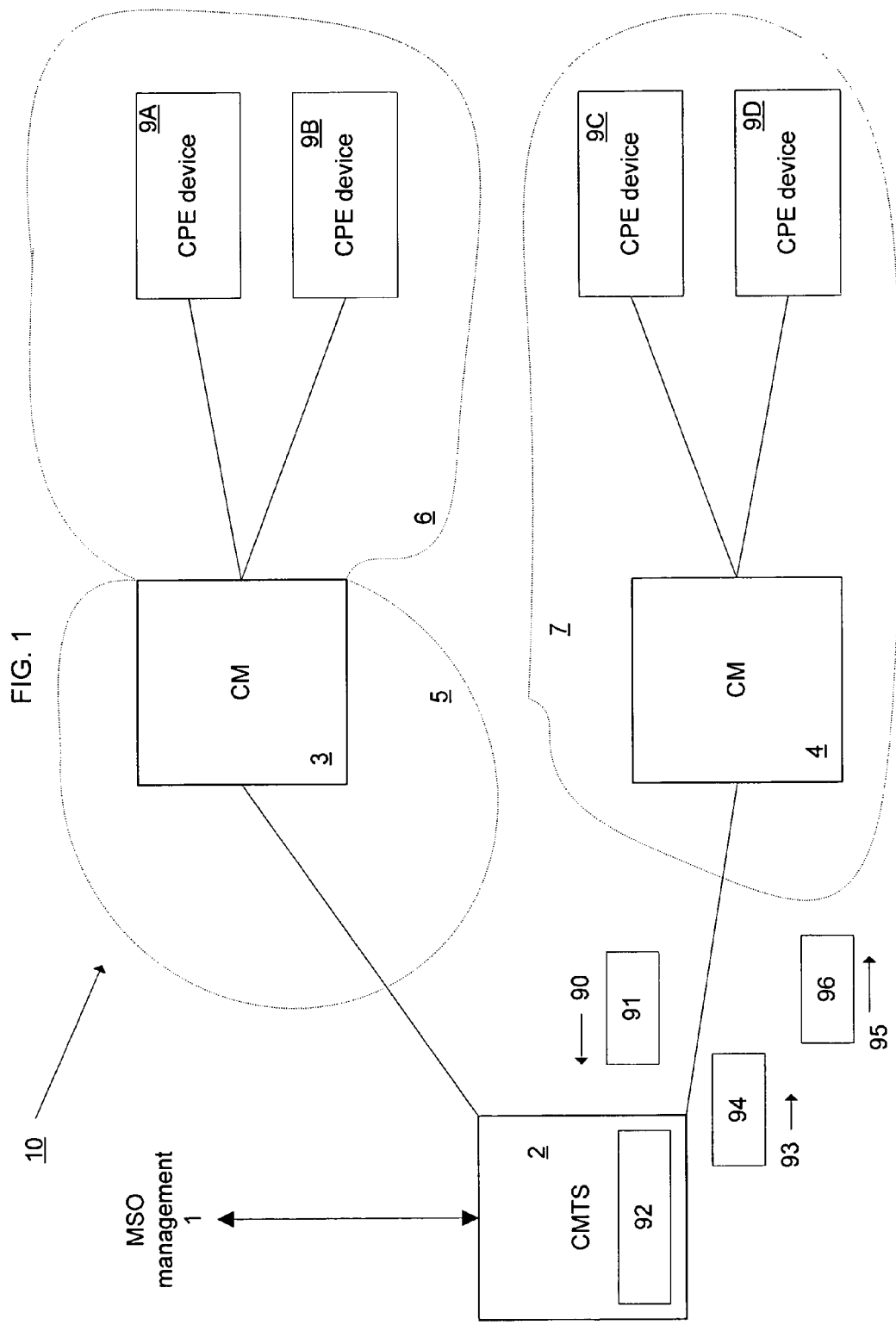
FIG. 1 is a diagram of a DOCSIS cable network.

Several preferred examples of the present application will now be described with reference to the accompanying drawings. Various other examples of the invention are also possible and practical. This application may be exemplified in many different forms and should not be construed as being limited to the examples set forth herein.

The figures listed above illustrate preferred examples of the application and the operation of such examples. In the figures, the size of the boxes is not intended to represent the size of the various physical components. Where the same element appears in multiple figures, the same reference numeral is used to denote the element in all of the figures where it appears.

Only those parts of the various units are shown and described which are necessary to convey an understanding of the examples to those skilled in the art. Those parts and elements not shown are conventional and known in the art.

For management and security reasons, MSOs may need to determine whether an Internet Protocol version 6 (IPv6) address belongs to a Cable Modem (CM) or a Customer Premise Equipment device (CPE). For example, the MSO may choose to forward an IPv6 datagram to one group of devices if the source address of that datagram belongs to a CM or to a CPE. An embodiment may provide the MSOs with this ability through leveraging IPv6 StateLess Address Auto-Configuration (SLAAC) prefixes.

In some IPv6 SLAAC embodiments, each device may append its own unique identifier to an IPv6 prefix. Therefore one IPv6 prefix value may be provided to a CM and another different IPv6 prefix value may be provided to a CPE device, allowing MSOs the ability to reliably determine whether an IPv6 address belongs to a CM or a CPE device by observing IPv6 address prefixes. In this example embodiment, when an address comprises a management IPv6 prefix, the IPv6 address can be associated with a CM. In another embodiment, when the IPv6 address comprises a service IPv6 prefix, the address can be associated with a CPE device.

FIG. 1 is a diagram of a DOCSIS cable network 10. In this example embodiment, CM 3 is configured as a router. For example, CM 3 may route traffic at layer 3 between CMTS 2 and CPE devices 9A and 9B. Accordingly, in this illustration CM 3 and CPE devices 9A and 9B may be in different network domains 5 and 6. Additionally, in the example embodiment in FIG. 1, CM 4 is configured as a bridge. For example, CM 4 may bridge traffic to CPE devices 9C and 9D. In this illustration CM 4 and CPE devices 9C and 9D may be in the same network domain 7.

MSO management 1 communicates with the CMTS 2 to designate a value for the management IPv6 prefix and a value for the service IPv6 prefix. It is then necessary for the CMTS 2 to provide the IPv6 prefixes to cable modems 3 and 4 and CPE devices 9A-D.

In some embodiments where cable network 10 uses SLAAC, CMTS 2 may not have a profile/list of the IPv6 addresses assigned to of each network device, e.g. CMs 3 and 4 and CPE devices 9A-D. Accordingly, it is difficult for the CMTS 2 to determine which device is a CM and which device is a CPE device. As previously mentioned, the CMTS can use the prefix values of the CM and CPE IPv6 addresses to differentiate efficiently between the two types of devices. However, it would be undesirable to send both IPv6 prefix values to all devices. In this scenario a user at a CPE device could use the management IPv6 prefix to form an IPv6 address that resembles a CM IPv6 address, and since MSOs send management communications to CM IPv6 addresses, the CPE device user could receive and observe the management communications. Therefore, some embodiments may provide a CMTS 2 to differentially assign IPv6 prefixes to devices, allowing better management and security over the network.

For example, CMTS 2 is shown to differently assign IPv6 prefixes to CMs and CPE devices. CMTS 2 receives a communication 90 from a device. CMTS 2 compares a source MAC address 91 included in the communication 90 to list 92 of registered CM devices. When there is a match, CMTS 2 sends a communication 93 including a management IPv6 prefix 94 to at least one CM 4. When there is no match, CMTS 2 sends a communication 95 including a IPv6 service prefix 96 to non-CM devices 9C and 9D.

A CMTS and a cable network are shown only for exemplarily purposes. Other embodiments include different management devices and different networks. Therefore, other embodiments may provide for any type of management device to provide different IPv6 prefixes to different devices in any type of network.

Figure 2:
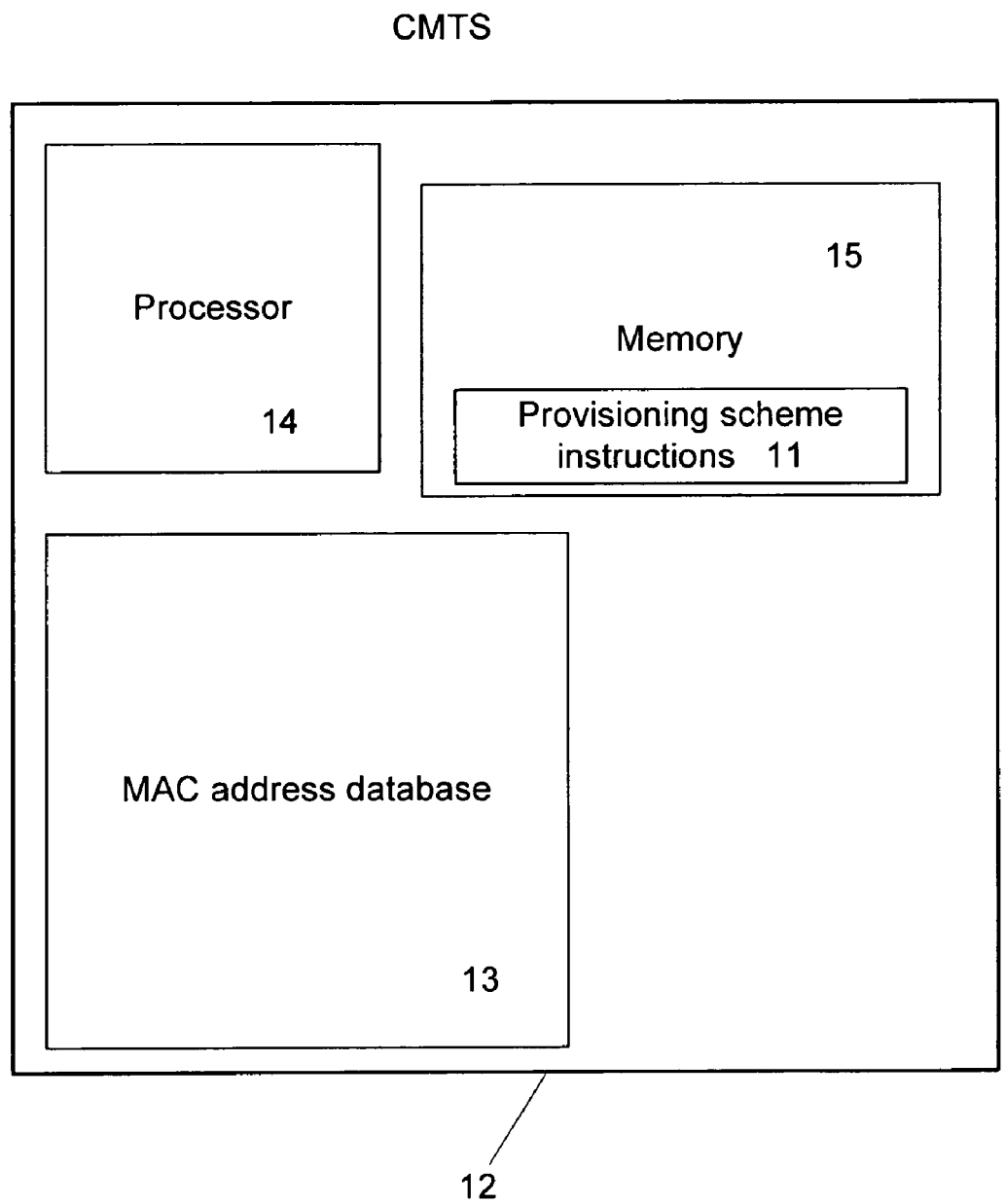
FIG. 2 is a detailed diagram of a CMTS to provision management IPv6 prefixes to CMs.

FIG. 2 is a detailed diagram of a CMTS that provisions management prefixes to CMs. The CMTS 12 includes a MAC address database 13, a processor 14 and a memory 15. The MAC address database 13 includes a list of MAC addresses for CMs registered with the CMTS 12. This list is populated when CMs downstream from the CMTS 12 initialize and register with the CMTS 12. The memory 15 includes provisioning scheme instructions 11 that, when executed by the processor 14, perform the functions described in the flowcharts of FIG. 3. Although a processor may be used to execute instructions included in memory, other hardware implementations such as ASICs may implement the flowchart of FIG. 3.

Figure 3:
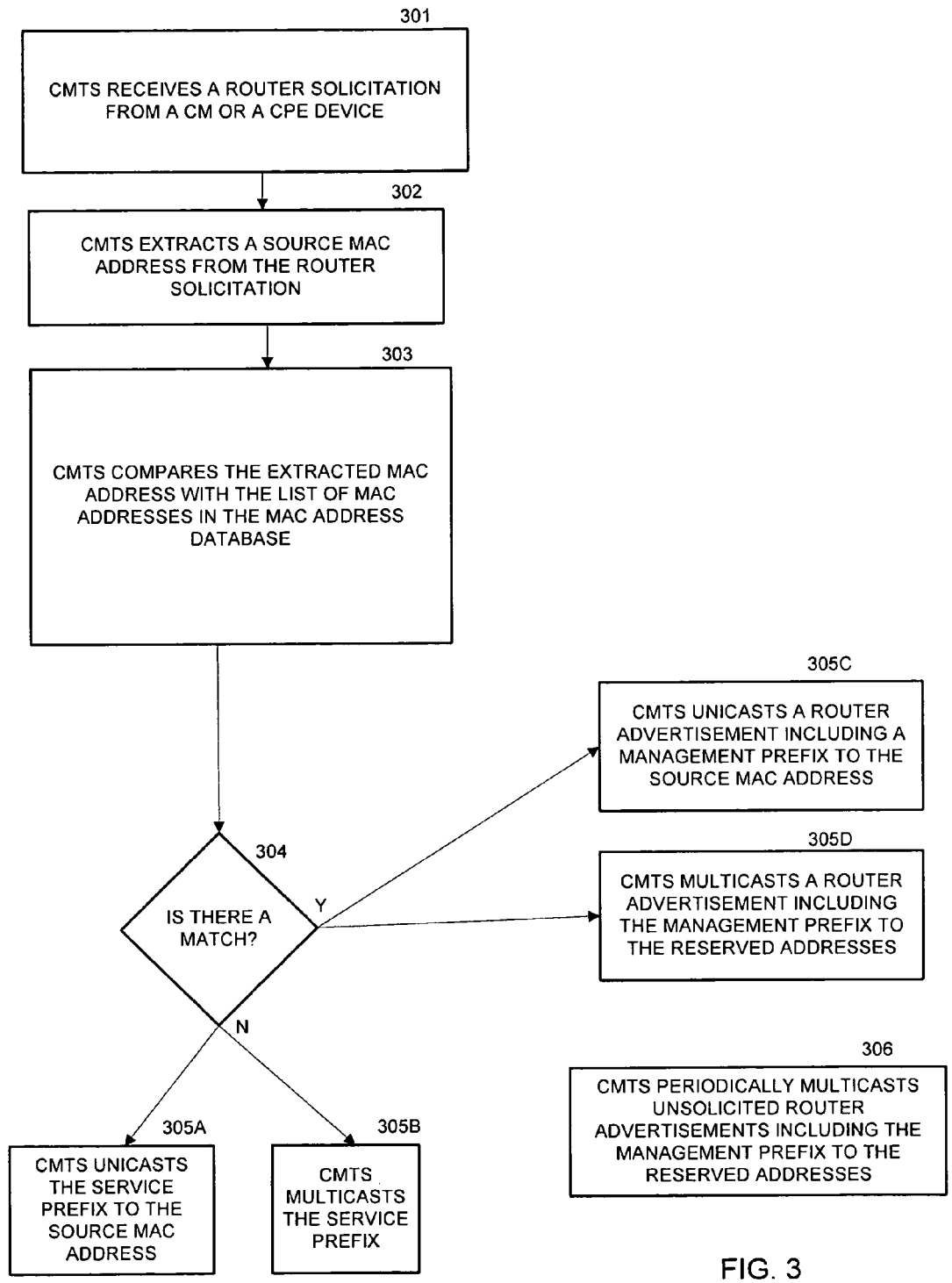
FIG. 3 is a flowchart showing how a CMTS may provision management IPv6 prefixes.

Referring to the embodiment method in FIG. 3, the CMTS 12 in block 301 may receive a router solicitation from a CM or CPE device. In block 302 the CMTS 12 may then extract the source MAC address from the router solicitation. The CMTS then compares the extracted MAC address with a MAC address in block 303.

Figure 9:
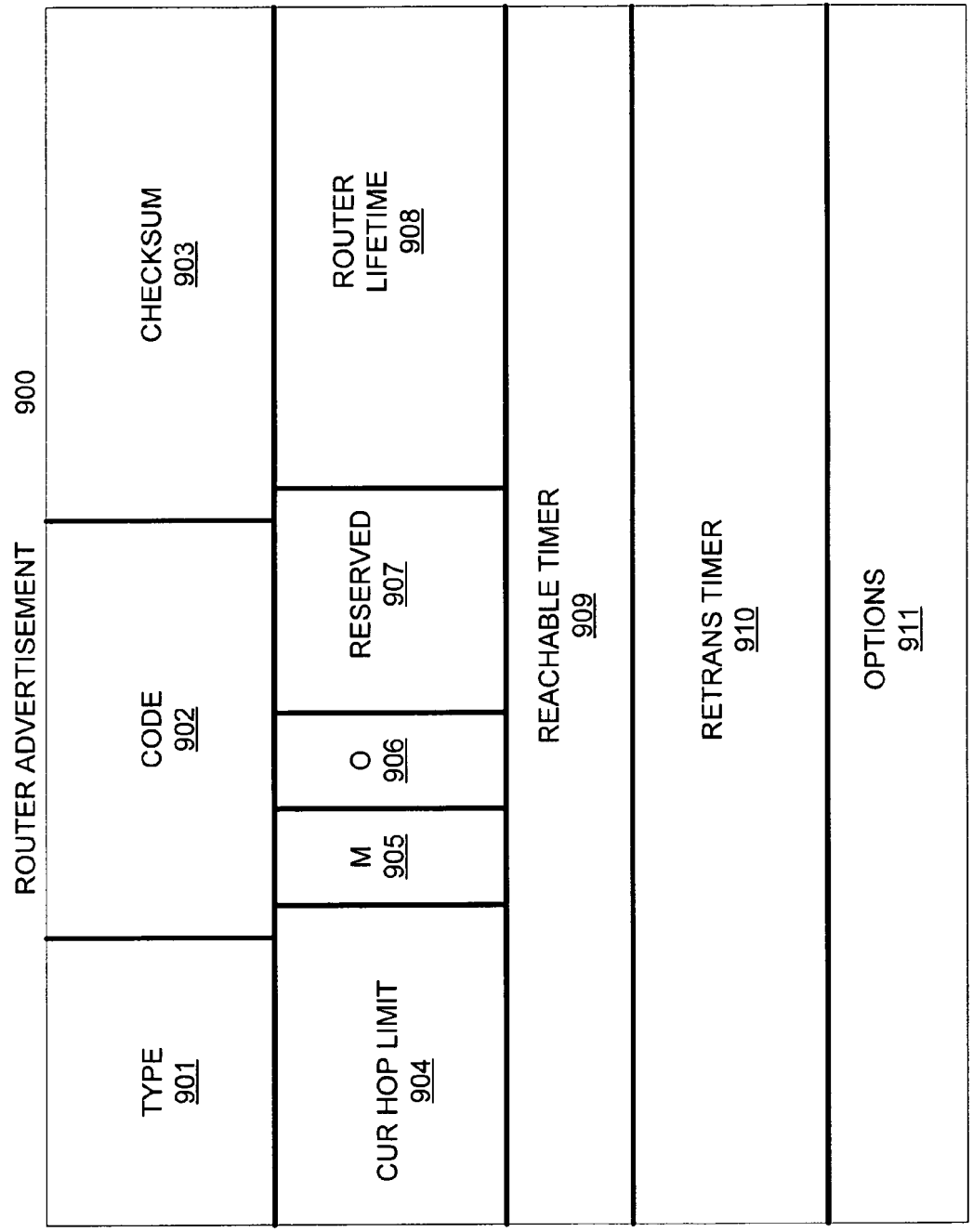
FIG. 9 is a diagram of a router advertisement.

If there is not a match in block 304, then the CMTS can determine that the router solicitation originated from a CPE device. Accordingly, in block 305A the CMTS 12 may unicast a router advertisement including the service IPv6 prefix back to the source MAC address. An example of a router advertisement is shown in FIG. 9. Referring back to FIG. 3, alternatively, in block 305B the CMTS 12 may multicast a router advertisement including the service IPv6 prefix. When a router advertisement including the IPv6 service prefix is multicasted, the multicast address is one that CMs do not listen to.

If there is a match in block 304, then the router solicitation originated from a CM. Accordingly, in block 305C the CMTS 12 may unicast a router advertisement including the management IPv6 prefix back to the source MAC address. Alternatively, in block 305D the CMTS 12 may multicast a router advertisement including the management IPv6 prefix to the reserved addresses defined by DOCSIS.

In some embodiments the reserved addresses are layer 2 multicast addresses. For example, as defined by DOCSIS, all CMs may treat DOCSIS reserved layer 2 addresses (addresses ranging from 01-E0-2F-00-00-02 to 01-E0-2F-00-00-0F) as layer 2 multicast addresses. CMs do not typically forward messages sent to these reserved layer 2 addresses. Thus, these DOCSIS reserved layer 2 addresses may be leveraged to multicast the IPv6 management prefix to all associated CMs in a single multicast IPv6 transmission without communicating the prefix value to CPE devices.

In block 306 the CMTS may periodically multicast router advertisements including the management IPv6 prefix to the reserved addresses. In some embodiments these periodic messages are unsolicited.

Figure 4:
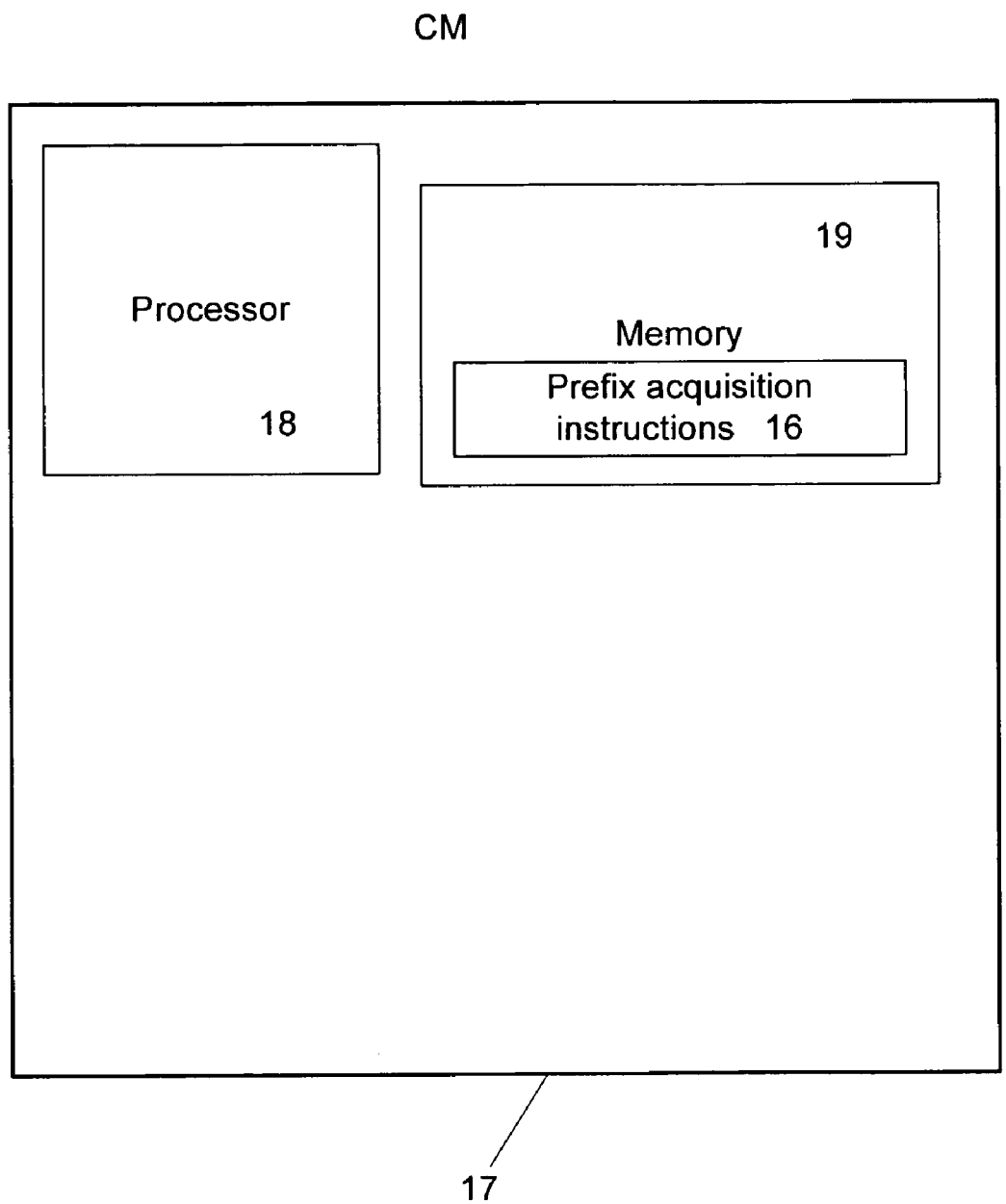
FIG. 4 is a detailed diagram of a CM to receive management IPv6 prefixes from a CMTS.

FIG. 4 is a detailed diagram of a CM that receives management IPv6 prefixes from a CMTS. The CM 17 includes a processor 18 and a memory 19. The memory 19 includes IPv6 prefix acquisition instructions 16 that, when executed by the processor 18, perform the functions described in the flowchart of FIG. 5. Although a processor may be used to execute instructions included in memory, other hardware implementations such as ASICs may implement the flowchart of FIG. 5.

Figure 5:
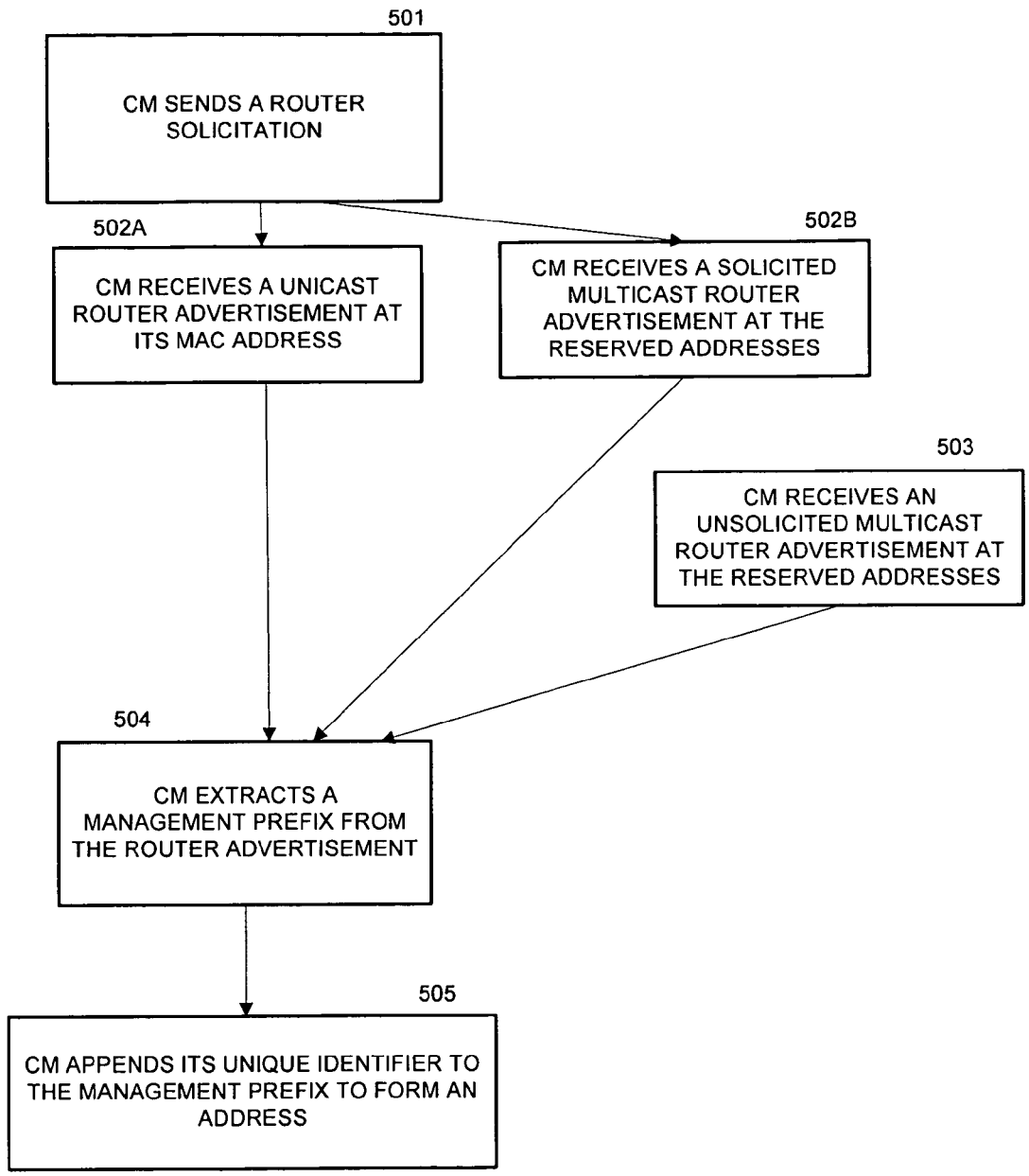
FIG. 5 is a flowchart showing how a CM may receive management IPv6 prefixes.

Referring to the example embodiment in FIG. 5, the CM 17 in block 501 may send a router solicitation. In response, the CM 17 may receive a unicast router advertisement from the CMTS in block 502A. Alternatively, in block 502B the CM 17 may receive a multicast router advertisement addressed, at layer 2, to the DOCSIS reserved addresses. Optionally, the CM 17 may receive an unsolicited multicast router advertisement addressed to the DOCSIS reserved addresses in block 503.

In block 504 the CM 17 extracts a management IPv6 prefix from the router advertisement. The CM 17 appends its unique identifier to the management prefix to form a complete IPv6 address.

Figure 6:
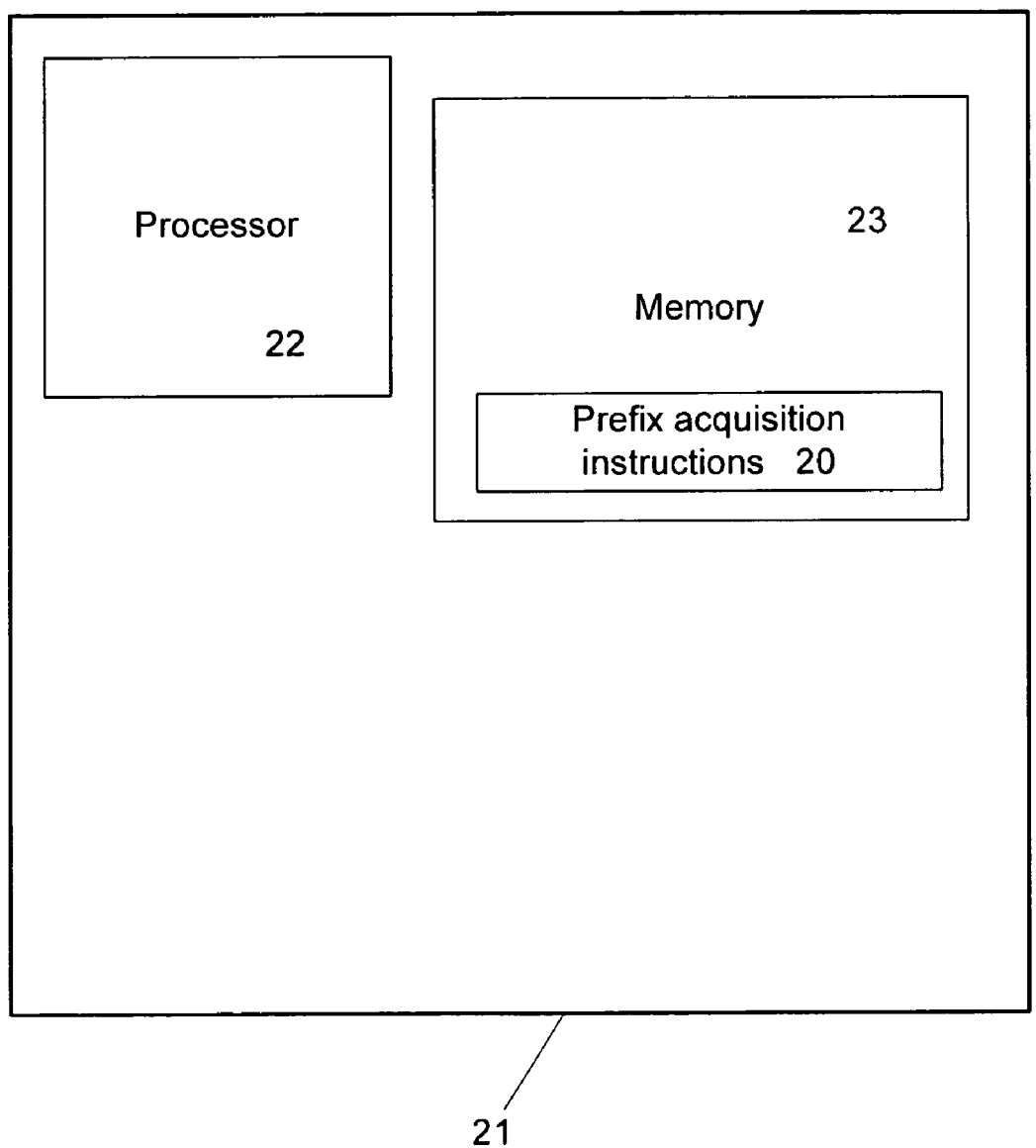
FIG. 6 is a detailed diagram of a CPE device to receive service IPv6 prefixes.

FIG. 6 is a detailed diagram of a CPE device that receives IPv6 service prefixes. The CPE device 21 includes a processor 22 and a memory 23. The memory 23 includes prefix acquisition instructions 20 that, when executed by the processor 22, perform the functions described in the flowchart of FIG. 7. Although a processor may be used to execute instructions included in memory, other hardware implementations such as ASICs may implement the flowchart of FIG. 7.

Figure 7:
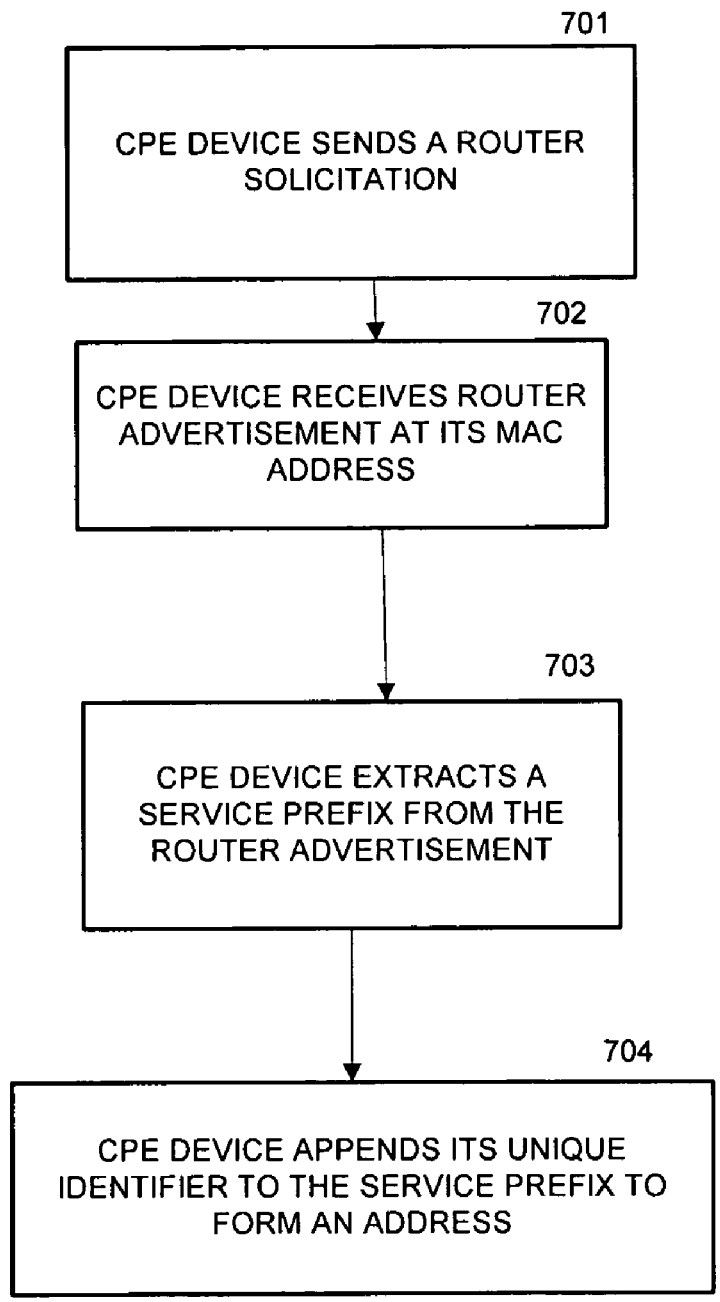
FIG. 7 is a flowchart showing how a CPE device may receive service IPv6 prefixes.

Referring to FIG. 7, the CPE device 21 in block 701 sends a router solicitation. In block 702 the CPE device 21 responsively receives back a router advertisement from the CMTS. In block 703 the CPE device 21 extracts an IPv6 service prefix from the router advertisement. The CPE device 21 appends its unique identifier to the service prefix to form a complete IPv6 address in block 704.

Figure 8:
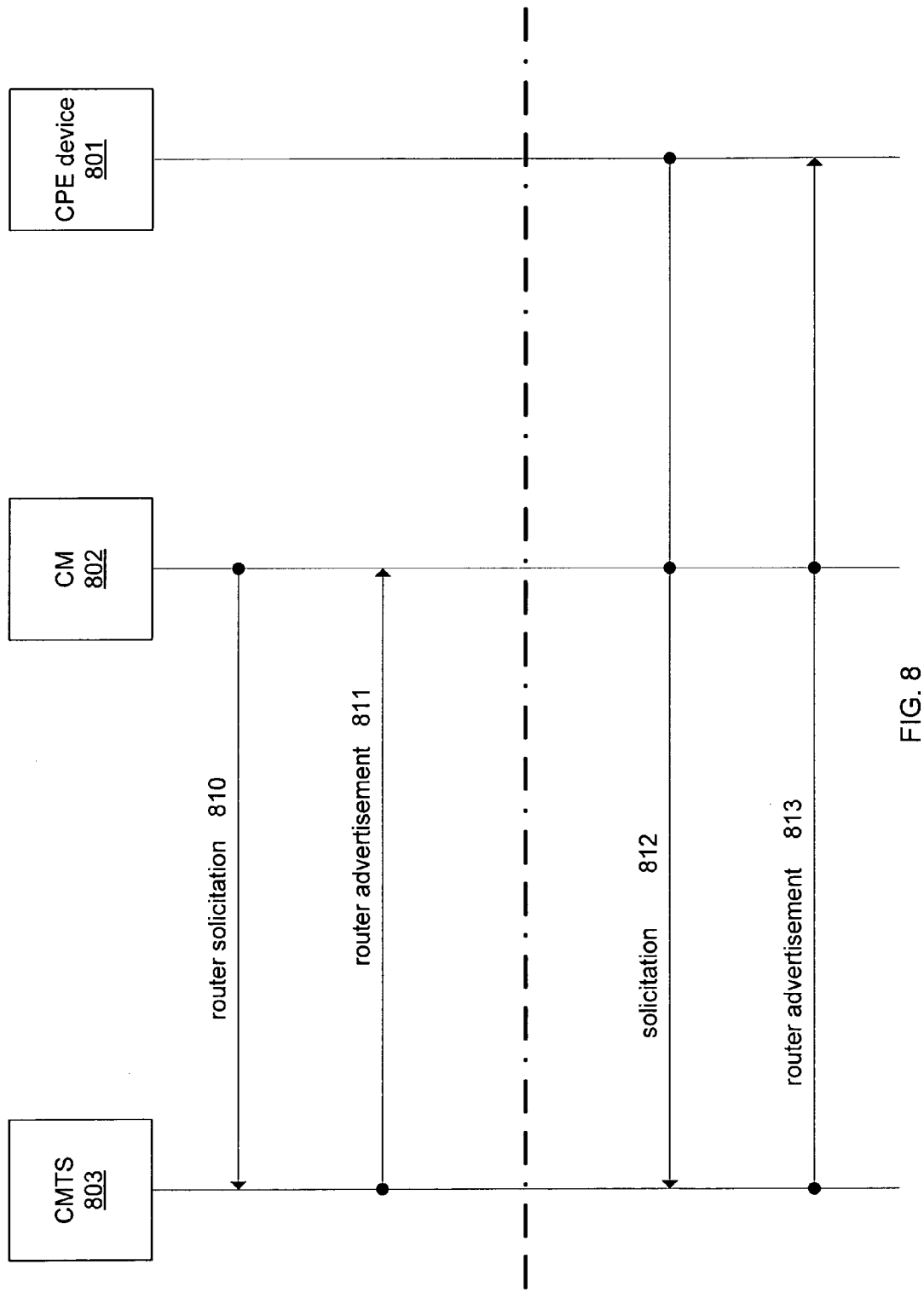
FIG. 8 is a signaling diagram showing how a CMTS can provision management and service IPv6 prefixes in a cable network.

FIG. 8 is a signaling diagram showing how a CMTS 803 can provision management and service IPv6 prefixes in a cable network. The CM 802 sends a router solicitation 810 to the CMTS 803. The CMTS 803 may compare the source MAC address of router solicitation 810 to a list of registered MAC addresses. Since the source MAC address belongs to the registered CM 802, there is a match. Accordingly the CMTS 803 sends a router advertisement 811 including an IPv6 management prefix to the CM 802. This router advertisement is not received by the CPE device 801.

Referring now to the bottom portion of FIG. 8, the CPE device 801 sends a solicitation 812 to the CMTS 803. The solicitation 812 is bridged by CM 802 and then received by CMTS 803.

The CMTS 803 compares the source MAC address of solicitation 812 to a list of registered MAC addresses. Since the source MAC address belongs CPE device 803, there is no match. Accordingly the CMTS 803 sends a router advertisement 813 including an IPv6 service prefix.

FIG. 9 is a diagram of a router advertisement. FIG. 9 illustrates a router advertisement 900 according to RFC 2461, which is herein incorporated by reference, and is publicly available. RFC 2461 references ICMPv6 according to RFC 2463, which is also incorporated by reference and is also publicly available.

Referring to FIG. 9, the Type 901 and Code 902 fields indicate the type of the message. The values assigned to these fields determine the format of the remaining data. The Checksum 903 is used to detect data corruption in the router advertisement 900.

The Cur Hop Limit 904 is an 8-bit value. This 8-bit value may be placed in the Hop Count field of an IP header. M 905 is a 1-bit managed address configuration flag. O 906 is a 1-bit non-address stateful provisioning flag. Setting M 905 and O 906 causes hosts to use stateful provisioning. Setting O 906 and not M 905 causes hosts to use stateless DHCP for non-address information. Not setting M 905 or O 906 results in no DHCP for establishing an address or other configuration information. Reserved 907 is a 6-bit unused field. Router Lifetime 908 is a 16-bit value that represents the lifetime associated with the default router in units of seconds. Router Lifetime 908 reflects the router's usefulness as a default router.

Reachable Time 909 is a 32-bit value that represents, in milliseconds, the time that a node assumes a neighbor is reachable after having received a reachable confirmation. Retrans Timer 910 is a 32-bit value that represents, in milliseconds, the time between retransmitted neighbor solicitation messages.

The Options field 911 may include many different fields. In one example, the Options field 911 may include a layer 2 source address for the device sending the Router Advertisement. In another example, the Options field 911 may include IPv6 prefix information such as an IPv6 management prefix or an IPv6 service prefix. Multiple options fields may contain prefix advertisements and a bit in the field, such as the first bit, may control whether a device uses SLAAC using the IPv6 prefix in that field.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred example thereof, it should be apparent that the invention may be modified in arrangement and detail without departing from such principles. I claim all modifications and variation coming within the spirit and scope of the following claims.

What is claimed is:

1. An apparatus comprising:
    a port to receive a solicitation; and
    a processor in communication with the port and configured to:
    populate a database of Media Access Control (MAC) addresses by extracting MAC addresses from cable modem registration messages as received and adding the extracted MAC addresses to the database, wherein the populated database contains only MAC addresses for cable modems and the database excludes MAC addresses of other devices operating in the cable network;
    compare a source MAC address included in the solicitation to the database;
    if the comparison indicates a match, send a communication including an Internet Protocol version 6 (IPv6) management prefix to a source of the solicitation, wherein the IPv6 management prefix comprises a first prefix value to be combined with a unique value on the source to form a first complete address; and
    if the comparison indicates no match, send a communication including an IPv6 service prefix to the source, wherein the IPv6 service prefix comprises a second different prefix value to be combined with the unique value to form a second different complete address.

2. The apparatus of claim 1, wherein the processor is configured to unicast the communication if the comparison indicates a match and multicast the communication if the comparison indicates no match.

3. The apparatus of claim 1, wherein the processor is configured to multicast the communication to a MAC address in the range of 01-EO-2F-00-00-02 to 0l-E0-2F-00-00-0F to broadcast the IPv6 management prefix to a plurality of cable modems if the comparison indicates a match, and send the communication using an address outside the range if the comparison indicates no match.

4. The apparatus of claim 2, wherein the unicasting is to the source MAC address.

5. A method for stateless address auto configuration comprising:
    populating a database of Media Access Control (MAC) addresses by extracting MAC addresses from cable modem registration messages as received and adding the extracted MAC addresses to the database, wherein MAC addresses of other devices operating in the cable network are absent from the database;
    extracting a source MAC address from a received solicitation;
    comparing the extracted source MAC address to the database;
    if the comparison indicates a match, sending a router advertisement including an Internet Protocol version 6 (IPv6) management prefix to a source of the solicitation, wherein the IPv6 management prefix comprises a first prefix value to be combined with a unique value on the source to form a first complete address; and
    if the comparison indicates no match, send a router advertisement including an IPv6 service prefix to the source, wherein the IPv6 service prefix comprises a second different prefix value to be combined with the unique value to form a second different complete address.

6. The method of claim 5 further comprising multicasting the router solicitation to a MAC address in the range of 01-E0-2F-00-00-02 to 01-E0-2F-00-00-0F to broadcast the IPv6 management prefix to a plurality of cable modems if the comparison indicates a match, and send the communication using an address outside the range if the comparison indicates no match.

7. The method of claim 5 wherein the router advertisement is sent to a link layer multicast address.

8. The method of claim 5 wherein the router advertisement is sent to the source MAC address.

9. The method of claim 5 wherein the router advertisement is sent over a Data Over Cable Service Interface Specification (DOCSIS) cable network.

10. A system comprising:
    means for extracting Media Access Control (MAC) addresses from cable modem registration messages as received and adding the extracted MAC addresses to a database, wherein MAC addresses of other devices operating in the cable network are absent from the database;
    means for extracting a source MAC address from a received communication;
    means for comparing the extracted source MAC address to the database; means for sending a router advertisement including an Internet Protocol version 6 (IPv6) management prefix in response to receiving the communication if the comparison indicates a match; and
    means for sending a router advertisement including an IPv6 service prefix in response to receiving the communication if the comparison indicates no match.

11. The system of claim 10 wherein the router advertisement is unicasted to the source MAC address.

12. The system of claim 10 further comprising means for multicasting the router advertisement to a MAC address in the range of 0l-E0-2F-00-0-02 to 01-E0-2F-00-00-0F to broadcast the IPv6 management prefix to a plurality of cable modems if the comparison indicates a match, and means for sending the communication using an address outside the range if the comparison indicates no match.

13. The system of claim 10 wherein the router advertisement is multicast.

14. The system of claim 10 wherein the router advertisement is sent over a Data Over Cable Service Interface Specification (DOCSIS) cable network.

15. The system of claim 10 wherein the router advertisement includes a router lifetime field, a reachable timer field and a retrans timer field.

* * * * *